March 23, 1954  J. M. MONTELIONE  2,672,913
MACHINE FOR FORMING CLOSURE CAPS
Filed April 27, 1951  2 Sheets-Sheet 1

INVENTOR
JOSEPH M. MONTELIONE
BY
ATTORNEY

March 23, 1954     J. M. MONTELIONE     2,672,913
MACHINE FOR FORMING CLOSURE CAPS
Filed April 27, 1951     2 Sheets-Sheet 2

INVENTOR
JOSEPH M. MONTELIONE
BY
ATTORNEY

Patented Mar. 23, 1954

2,672,913

UNITED STATES PATENT OFFICE 2,672,913

MACHINE FOR FORMING CLOSURE CAPS

Joseph M. Montelione, Brooklyn, N. Y.

Application April 27, 1951, Serial No. 223,253

1 Claim. (Cl. 153—72)

This invention relates to new and useful improvements in machines for forming closure caps, nozzles for cans, and other shell-like objects, and has more particular reference to an improvement in my Patent No. 2,465,253, granted March 22, 1949.

In my patent the machine can take only one diameter of male and female chucks. For this reason the machine is limited to forming but one size of closure cap, or nozzle, or other article. This invention particularly proposes an improved construction which will permit this new machine to take male and female chucks of various diameters so that various diameters of closure caps and other articles may be formed.

The dominating object of this invention resides in a new construction in which one of the chuck spindles may be adjusted to various positions in relation to the other of the chuck spindles so that caps and articles of various diameters may be formed on the machine by employing various diameter chucks on said spindles. More particularly, it is proposed that the female chuck be mounted on a spindle which is supported on a member pivotally mounted on the main shaft of the machine. Means is provided for holding this member in various selected pivoted positions in order that chucks of various diameters may be used on the spindles of the machine.

Another object of this invention resides in so constructing the machine so that it operates in the identical way with chucks of selected diameters.

Another object of the invention is the construction of a machine as described which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawings forming a material part of this disclosure—

Figures 1, 2:
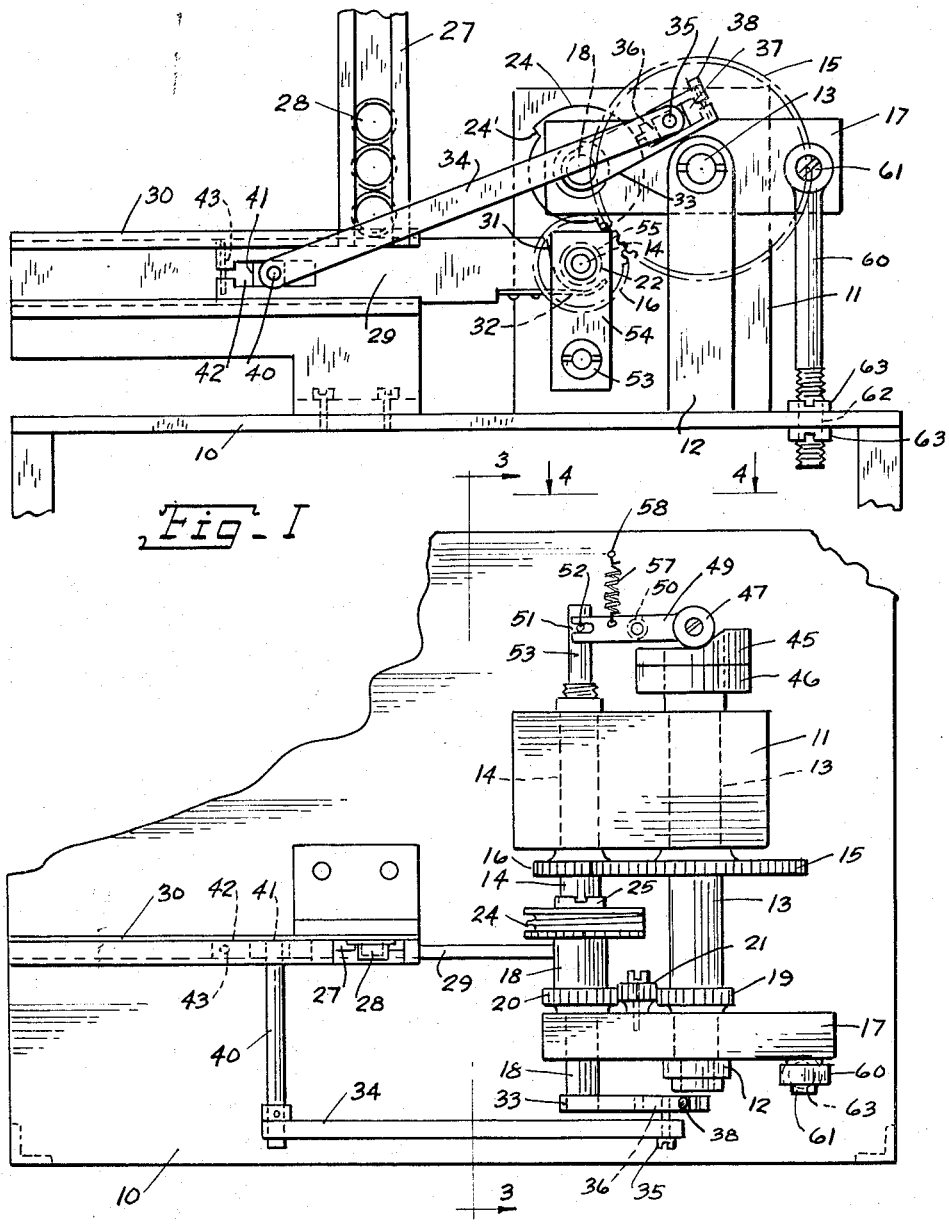
Fig. 1 is a side elevational view of the new machine for forming closure caps, nozzles for cans and other shell-like objects constructed in accordance with this invention.
Fig. 2 is a fragmentary plan view of Fig. 1.

The machine for forming closure caps, and other objects, in accordance with this invention, includes a table 10 supporting a frame 11 and a support 12 spaced from the frame 11. A shaft 13 is rotatively mounted on the frame 11 and support 12. A first spindle 14 is rotatively mounted on the frame 11 and is disposed parallel to the shaft 13. The said spindle 14 is spaced to one side and below the shaft 13. A first transmission connects the shaft 13 with the said first spindle 14. This transmission comprises a large gear 15 mounted on the shaft 13 to the front of the frame 11 and meshing with a small gear 16 mounted on the first spindle 14.

A member 17 is axially pivotally mounted on the shaft 13 immediately adjacent the support 12 and preferably located between the support 12 and the frame 11. A second spindle 18 is rotatively mounted on said member 17 and is spaced from and disposed parallel to the shaft 13. A second transmission connects the shaft 13 with this second spindle 18. This second transmission comprises gears 19 and 20 respectively mounted on the shaft 13 and the second spindle 18 and an idler gear 21 mounted on the member 17 between the gears 19 and 20 and meshes with these gears. Rotations from the shaft 13 will be transmitted to the first spindle 14 which will be driven in one direction, and to the second spindle 18, which will be driven in the opposite direction.

Figures 3, 4:
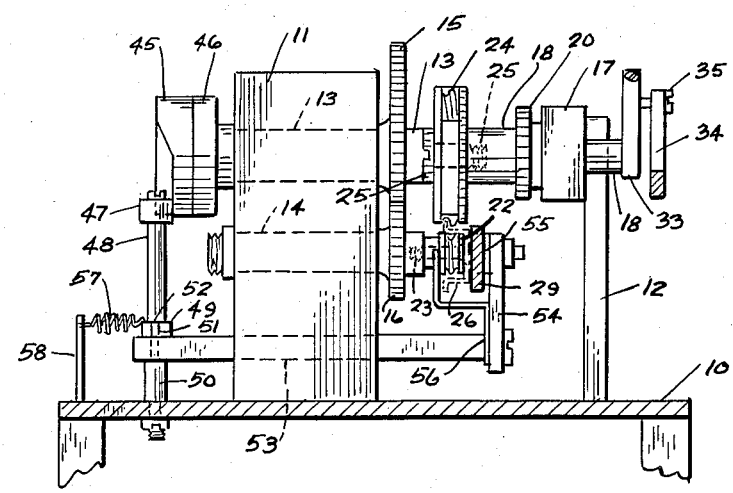
Fig. 3 is a vertical sectional view taken on the line 3—3 of Fig. 2.
Fig. 4 is a fragmentary back view looking in the direction of the line 4—4 of Fig. 2.

A male chuck 22 is removably mounted on the said spindle 14 with a screw 23 or other fastening element. A cooperative female chuck 24 is removably mounted upon the second spindle 18 with a screw 25 or other fastening element. These chucks 22 and 24 are cooperative with each other upon rotation to form closure caps, nozzles for cans and other shell-like objects from hat shaped cap shells or from straight cap shells. These chucks may bead or trim the edges of the caps, or other objects, form the threads at their centers, and knurl their opposite ends, or these chucks may perform other cap forming operations on caps, nozzles and other shell-like objects. These operations may be performed simultaneously or in succession, as desired. The dot and dash lines 26 in Fig. 3 schematically illustrates a hat shaped cap shell upon the male chuck 22.

The male chuck 22 is associated with means for engaging the hat shaped cap shells, or straight shell shaped caps, or nozzles, etc., thereon to be formed by said chucks 22 and 24 into the closure caps or other objects and for removing the formed closure caps or other articles from the male chuck 22. This means includes a supply chute 27 in which the hat shaped cap shells 28 are stacked one above the other. The supply chute 27 terminates adjacent the top of a feeder slide 29 which is horizontally slidably mounted in a guide bracket 30. The feeder slide 29 has a curved front end 31 into which one cap shell 28 may enter at one time. A leaf spring 32 is mounted on the bottom of the feeder slide 29 and forms a support for the said one cap shell. This leaf spring 32 is capable of flexing downwards off of the cap shell 28 which is engaged upon the male chuck 22, when the slide 29 is moved towards the left from the position shown in Fig. 1.

A crank 33 is mounted on the front end of the second spindle 18. An operator link 34 pivotally connects with the crank 33 and with the feeder slide 29 for reciprocating the slide 29 during rotation of the second spindle 18. The operator link 34 is adjustably connected with the crank 33 and with the feeder slide 29. More particularly, a stud 35 is mounted upon one end of the operator link 34 and connects with a block 36 which is adjustably clamped in a slot 37 formed in the crank 33. A clamp screw 38 serves to clamp the block 36 in selected positions in the slot 37. Another stud 40 is mounted on the other end of the operator link 34 and engages a block 41 which is adjustably mounted in a slot 42 formed in the feeder slide 29. The block 41 is clamped in adjusted positions in the slot 42 by a clamp screw 43.

A cam 45 is mounted upon a rear end of the shaft 13. A pulley 46 is mounted on the shaft 13 adjacent the cam 45. This pulley may be driven with a motor driven belt or other drive means not shown on the drawing. A follower wheel 47 engages the cam 45. This follower wheel 47 is mounted on a rod 48 mounted on a pivoted bracket 49. The bracket 49 is pivoted intermediate of its ends by a stem 50 which is pivotally mounted on the table 10. The rod 48 is positioned at one end of the bracket 49. The other end of the bracket 49 is formed with a slot 51 which is engaged by a pin 52 mounted on a bar 53 which is slidably mounted through the frame 11. A vertical arm 54 is mounted on the front end of the bar 53. A pusher head 55 is mounted on the top of the vertical arm 54 and is at a location to be capable of pushing a cap shell from the feeder slide 29 to a position on the male chuck 22. A knock-off finger 56 is also mounted on the rod 53 and engages behind a cap shell on the male chuck 22 and is capable of knocking said cap shell off the male chuck 22 after the cap shell has been duly formed. A spring 57 connects with the pivoted bracket 49 and is mounted upon a pin 58 mounted on the table 10. This spring 57 acts to pivot the bracket 49 so as to engage the follower wheel 47 against the cam 45.

The member 17 is associated with means for holding said member 17 in selected pivoted positions on the shaft 13 in order to hold the female chuck 24 at selected spaced positions from the male chuck 22. This means includes a link 60 pivotally connected at its top end by a stud 61 with one end of the member 17. The bottom end of the link 60 engages through an opening 62 formed in the table 10. Adjustment nuts 63 threadedly engage on the bottom end portion of the link 60 and engage the top end bottom faces of the table 10 for holding the link 60 in selected adjusted positions.

The operation of the device may be understood from the following:

The shaft 13 is rotated by driving the pulley 46.

The gears 15 and 16 will drive the male chuck 22 in one direction. The gears 19, 21 and 20 will drive the female chuck 24 in the other direction. For each rotation of the female chuck 24, the crank 33 will make one turn. This turn will be transmitted by the operator link 34 to reciprocate the feeder slide 29 through one cycle. This cycle consists in the feeder slide 29 assuming a position to the extreme left at which position one of the cap shells 28 will move down the supply chute 27 into the curved front end 31 of the feeder slide 29 and come to rest on the leaf spring 32. The feeder slide 29 will next assume a position which will align the cap shell axially with the male chuck 22. At this point the cam 45 functions to permit the spring 57 to pivot the bracket 49 so as to move the slidable rod 53 rearwards and cause the pusher head 55 to push the cap shell upon the male chuck 22. The female chuck 24 has a cutout portion 24', clearly seen in Fig. 1, to permit the cap shell to engage upon the male chuck 22. The female chuck 24 now cooperates with the male chuck 22 in forming the cap shell. The female chuck 24 is of a larger diameter than the male chuck so that the several forming steps required on the cap shell may be performed. These steps may be performed in succession or simultaneously, depending merely on design. When the closure cap has been satisfactorily formed the cam 45 functions to pivot the bracket 49 and move the slidable rod 53 forwards so that the knock-off finger 56 knocks the cap off of the male chuck 22. This cycle of operation now repeats.

An important feature of this invention resides in the fact that the member 17 may be adjusted to various pivoted positions so as to separate the spindle 18 for the female chuck 24 from the spindle 14 for the male chuck 22 to selected positions to accommodate chucks of different diameters to operate on closure caps of different diameters. The member 17 may be adjusted by loosening the nuts 63 and moving the link 60 upwards or downwards, as required. This causes the member 17 to pivot on the shaft 13. The nuts 63 then are used to lock the member 17 in its new position. The block 36 may now be adjusted in the slot 37 so as to correct the throw of the feeder slide 29 to operate the correct distance to feed the cap shells 28 from the chute 27 to the male chuck 22. The block 41 may be adjusted in a slot 42 to facilitate this correct adjustment. A new male chuck 22 and a new female chuck 24 may be engaged upon the spindles 14 and 18, respectively, and the machine is now ready to form new sized caps.

While I have illustrated and described the preferred embodiment of my invention, it is to be understood that I do not limit myself to the precise construction herein disclosed the right is reserved to all changes coming within the scope of the invention as defined in the appended claim.

Having thus described my invention, what I claim as new and desire to secure by United States Letters Patent is:

A machine for forming closure caps, comprising a male chuck and a female chuck cooperative with each other upon rotation in opposite directions to form shell-like objects, means for engaging shells onto said male chuck to be formed by said chucks into said objects and for removing the formed objects from said male chuck, a peripheral cutout formed in said female chuck to provide clearance for the shell-like objects when they are mounted on and removed from the male chuck, a rotatively mounted shaft, a first spindle rotatively mounted parallel to said shaft and carrying said male chuck, a first transmission connecting said shaft and said first spindle, a member axially pivotally mounted on said shaft, a second spindle rotatively mounted on said member spaced from and parallel to said shaft and carrying said female chuck, a second transmission connecting said shaft and said second spindle, and means for shifting said member to and holding said member in selected pivoted positions on said shaft relative to said first spindle, whereby the female chuck is adjustable relative to the male chuck both toward and away from said male chuck to accommodate shell-like objects of different dimensions, said second transmission comprising a gear train including a gear mounted on said member and meshing with gears mounted on said shaft and on said second spindle.

JOSEPH M. MONTELIONE.

References Cited in the file of this patent

UNITED STATES PATENTS

| Number | Name | Date |
|---|---|---|
| 1,070,682 | Graf | Aug. 19, 1913 |
| 1,254,026 | Carvalho | Jan. 22, 1918 |
| 1,391,492 | Osswald | Sept. 20, 1921 |
| 1,423,173 | Anderson | July 18, 1922 |
| 2,122,525 | Huntsman | July 5, 1938 |